J. F. BOES.
COMBINED HARROW AND CLOD CRUSHER.
APPLICATION FILED SEPT. 20, 1913.
1,107,480.
Patented Aug. 18, 1914.
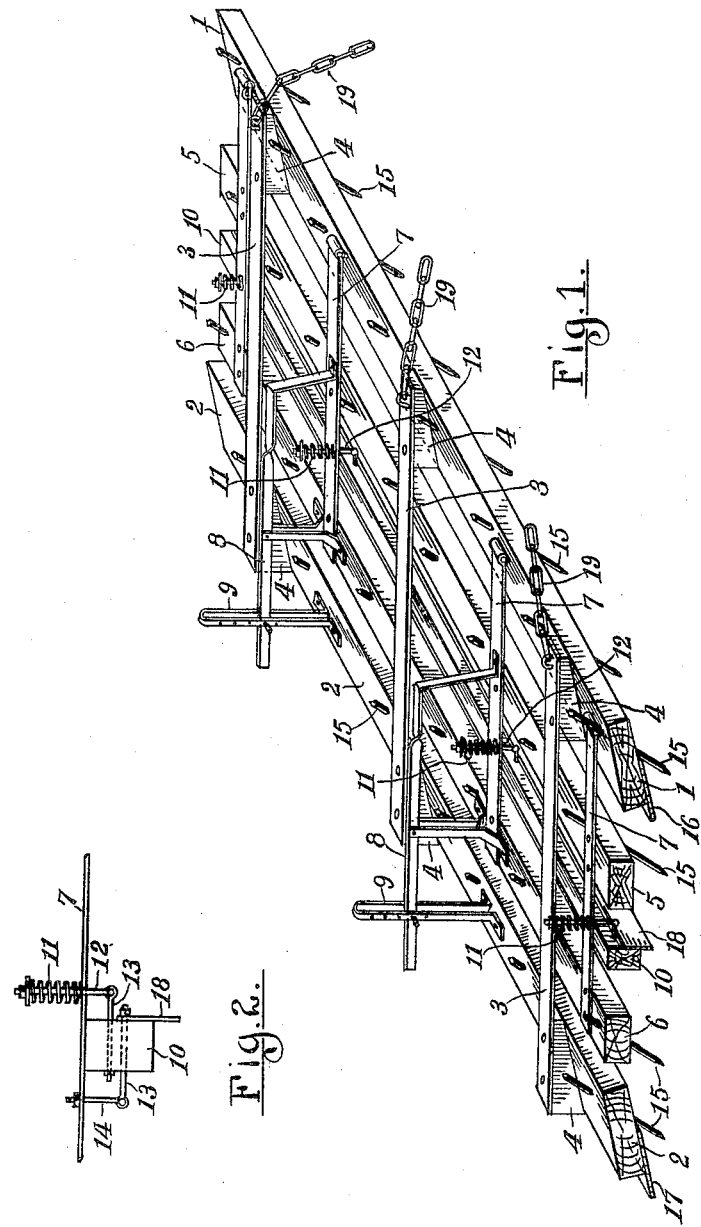
WITNESSES:
Hazel Foster
Mae Rankin
INVENTOR
Jacob F. Boes.
BY
Luther V. Moulton
ATTORNEY

UNITED STATES PATENT OFFICE.

JACOB F. BOES, OF BAY CITY, MICHIGAN.

COMBINED HARROW AND CLOD-CRUSHER.

1,107,480.

Specification of Letters Patent.   Patented Aug. 18, 1914.

Application filed September 20, 1913.   Serial No. 790,906.

*To all whom it may concern:*

Be it known that I, JACOB F. BOES, a citizen of the United States of America, residing at Bay City, in the county of Bay and State of Michigan, have invented certain new and useful Improvements in a Combined Harrow and Clod-Crusher; and I do hereby declare the following to be a full, clear, and exact description of the invention, such as will enable others skilled in the art to which it appertains to make and use the same.

My invention relates to improvements in a combined harrow and clod crusher, and its object is to provide a device that will effectually harrow and disintegrate the soil, and at the same time crush and pulverize the clods therein, and to provide the same with various new and useful features hereinafter more fully described and particularly pointed out in the claims, reference being had to the accompanying drawings, in which:—

Figure 1 is a perspective of a device embodying my invention; and Fig. 2 is a detail showing the method of supporting the bar 10.

Like numbers refer to like parts in both of the figures.

The main frame of the device consists of two beams 1 and 2 arranged parallel and spaced apart and also connected by bars 3 rigidly attached thereto. These beams are each inclined upward at the forward edge by means of wedge blocks 4 interposed between the beams and the bars with the thick end toward the rear. Intermediate these beams, arranged parallel and spaced apart from each other and the beams, are three smaller beams 5, 6, and 10, the beams 5 and 6 being secured to bars 7 arranged at intervals transversely thereof and each hinged at the forward end to the forward beam 1 and free to rise and fall at the rear. The middle beam 10 is supported below the bars 7 by means of vertical bolts 12 and 14, pivoted at their lower ends to horizontal bolts 13 extending through the beam 10. The forward bolt 12 is yieldably supported by a coiled spring 11, and the bolt 14 is fixed in the bar 7. All the beams except the middle beam 10 are provided with drag teeth 15 extending downward and rearward through the same, and thus adapted to rise over any obstructions engaged thereby. In addition thereto the beams 1 and 2 are provided with metallic plates 16 and 17 attached to the under side thereof and extending rearwardly and downwardly therefrom, and the middle beam 10 is provided with a vertical plate 18 extending below the same. The device is also provided with the usual drag chains 19 to attach a team thereto.

To adjust the beams 5, 6, and 10, relative to the main frame, arms 8 are rigidly mounted on two of the pivoted bars 7 and extending rearwardly over the rear beam 2 are vertically adjustable in yokes 9 mounted on said rear beam. In operation, as the beam 1 moves forward, the drag teeth loosen up the soil and the plate 16 will smooth the surface of the same and crush any clods or lumps of earth engaged thereby. The teeth in the beam 5 will then again disintegrate the soil and the scraper plate 18 again smooth the surface of the same without compressing it. Should this plate strike any unyielding obstruction, the springs 11 will yield and allow the beam 10 to swing rearward and downward, and thus permit the plate to slide over the obstruction. The drag teeth in the beams 6 and 2 again thoroughly disintegrate the soil and the inclined plate 17 finally smooths the surface thereof, leaving the soil smooth and well pulverized.

What I claim is:—

1. A combined harrow and clod crusher, comprising front and rear beams arranged parallel and spaced apart, bars connecting the beams, beams intermediate the front and rear beams, bars pivoted to the front beam and attached to the intermediate beams, inclined drag teeth inserted in the bars, plates attached to the front and rear beams and extending rearwardly and downwardly therefrom, and means for vertically adjusting the intermediate beams.

2. A combined harrow and clod crusher, comprising front and rear beams spaced apart, bars connecting said beams and attached thereto, wedge blocks between the bars and beams, plates attached to the beams and extending rearwardly and downwardly therefrom, intermediate beams parallel with the front and rear beams and spaced apart, bars pivoted to the front beam and attached to the intermediate beams, means for vertically adjusting said intermediate beams, drag teeth in the beams and rearwardly inclined at the lower end, and a middle beam having a scraper plate attached thereto.

3. A combined harrow and clod crusher, comprising front and rear beams spaced apart and transversely inclined downward and rearward, plates attached to the under side of said beams, bars connecting said beams, two intermediate beams parallel with the front and rear beams and spaced apart, bars pivoted to the front beam and rigidly attached to said intermediate beams, means for vertically adjusting the said intermediate beams, a middle beam yieldably connected to the pivoted bars and adapted to swing downward and rearward, and a scraper plate attached to the middle beam.

In testimony whereof I affix my signature in presence of two witnesses.

JACOB F. BOES.

Witnesses:
FRANK C. LEAMAN,
IDA L. BEAUDIN.

---

Copies of this patent may be obtained for five cents each, by addressing the "Commissioner of Patents, Washington, D. C."